United States Patent
Yamamoto et al.

(10) Patent No.: US 7,590,424 B2
(45) Date of Patent: Sep. 15, 2009

(54) POSITION MEASURING METHOD AND MOBILE COMMUNICATION TERMINAL

(75) Inventors: Hiroyuki Yamamoto, Tokyo (JP); Katsutoshi Murata, Kunitachi (JP)

(73) Assignee: NTT DoCoMo, Inc., Tokyo (JP)

( * ) Notice: Subject to any disclaimer, the term of this patent is extended or adjusted under 35 U.S.C. 154(b) by 194 days.

(21) Appl. No.: 10/343,075

(22) PCT Filed: Mar. 26, 2002

(86) PCT No.: PCT/JP02/02904

§ 371 (c)(1),
(2), (4) Date: Jan. 23, 2003

(87) PCT Pub. No.: WO02/079797

PCT Pub. Date: Oct. 10, 2002

(65) Prior Publication Data

US 2004/0029583 A1     Feb. 12, 2004

(30) Foreign Application Priority Data

Mar. 29, 2001  (JP) .............................. 2001-097512

(51) Int. Cl.
H04W 24/00 (2009.01)
G01S 1/00 (2006.01)
G01C 21/00 (2006.01)

(52) U.S. Cl. .............................. 455/456.1; 342/357.01; 342/357.02; 342/357.09; 342/357.1; 342/357.15; 701/213; 701/214

(58) Field of Classification Search ...... 455/456–456.6, 455/404.2, 456.1, 457; 701/207, 213–216; 342/358, 357.15, 357.09, 357.02, 357.03, 342/357.06, 357.1, 357.14, 357.01, 357.05; 340/426

See application file for complete search history.

(56) References Cited

U.S. PATENT DOCUMENTS

| 5,581,261 | A | * | 12/1996 | Hickman et al. ............. 342/385 |
| 5,832,381 | A | * | 11/1998 | Kauppi ..................... 455/432.1 |
| 5,999,125 | A | * | 12/1999 | Kurby ...................... 342/357.1 |
| 6,070,078 | A |   | 5/2000  | Camp, Jr. et al. |
| 6,081,229 | A |   | 6/2000  | Soliman et al. |
| 6,411,811 | B2 | * | 6/2002 | Kingdon et al. ........... 455/456.5 |
| 6,429,808 | B1 | * | 8/2002 | King et al. .............. 342/357.02 |

(Continued)

FOREIGN PATENT DOCUMENTS

CN     1276875 A     12/2000

(Continued)

OTHER PUBLICATIONS

Electronic Translation: JP 2000-055686.*

(Continued)

*Primary Examiner*—Vincent P Harper
*Assistant Examiner*—Marivelisse Santiago-Cordero
(74) *Attorney, Agent, or Firm*—Brinks Hofer Gilson & Lione

(57) ABSTRACT

Each time mobile communication terminal 10 moves a distance of 150 kilometers, it computes its approximate position by performing a stand-alone position measurement, and stores the approximate position. When mobile communication terminal 10 needs to precisely measure its location it notifies position measurement assist server 30 of the stored approximate position, to thereby perform a GPS position measurement operation by using satellite capturing data transmitted, accordingly, from position measurement assist server 30.

25 Claims, 10 Drawing Sheets

U.S. PATENT DOCUMENTS

| | | | |
|---|---|---|---|
| 6,438,382 B1 * | 8/2002 | Boesch et al. ............ | 455/456.6 |
| 6,480,149 B1 * | 11/2002 | Sutherland et al. ....... | 342/357.1 |
| 6,539,230 B2 * | 3/2003 | Yen ......................... | 455/456.1 |
| 2002/0154058 A1 * | 10/2002 | Pande et al. ............ | 342/357.09 |
| 2002/0173909 A1 * | 11/2002 | Verbil ....................... | 701/213 |
| 2003/0027582 A1 * | 2/2003 | Hayashida ................. | 455/456 |
| 2003/0151547 A1 * | 8/2003 | Mauro et al. ........... | 342/357.15 |
| 2005/0043038 A1 * | 2/2005 | Maanoja et al. .......... | 455/456.1 |

FOREIGN PATENT DOCUMENTS

| | | | |
|---|---|---|---|
| EP | 0 957 370 A1 | | 11/1999 |
| JP | 62-298785 | * | 12/1987 |
| JP | S62-298785 | | 12/1987 |
| JP | 63-111485 | | 5/1988 |
| JP | S63-111485 | | 5/1988 |
| JP | 08-278338 | | 10/1996 |
| JP | 09-113598 | | 5/1997 |
| JP | 09-116949 | | 5/1997 |
| JP | 9-311177 | * | 12/1997 |
| JP | 11-83976 | | 3/1999 |
| JP | 2000055686 A | * | 2/2000 |
| JP | 2000-131415 | | 5/2000 |
| WO | WO99/57576 A1 | | 11/1999 |

OTHER PUBLICATIONS 200206899-7, Singapore Written Opinion dated Sep. 18, 2006.
Chinese Office Action, Nov. 3, 2006, Corresponding Chinese Patent Application No. 02800994.0.

* cited by examiner

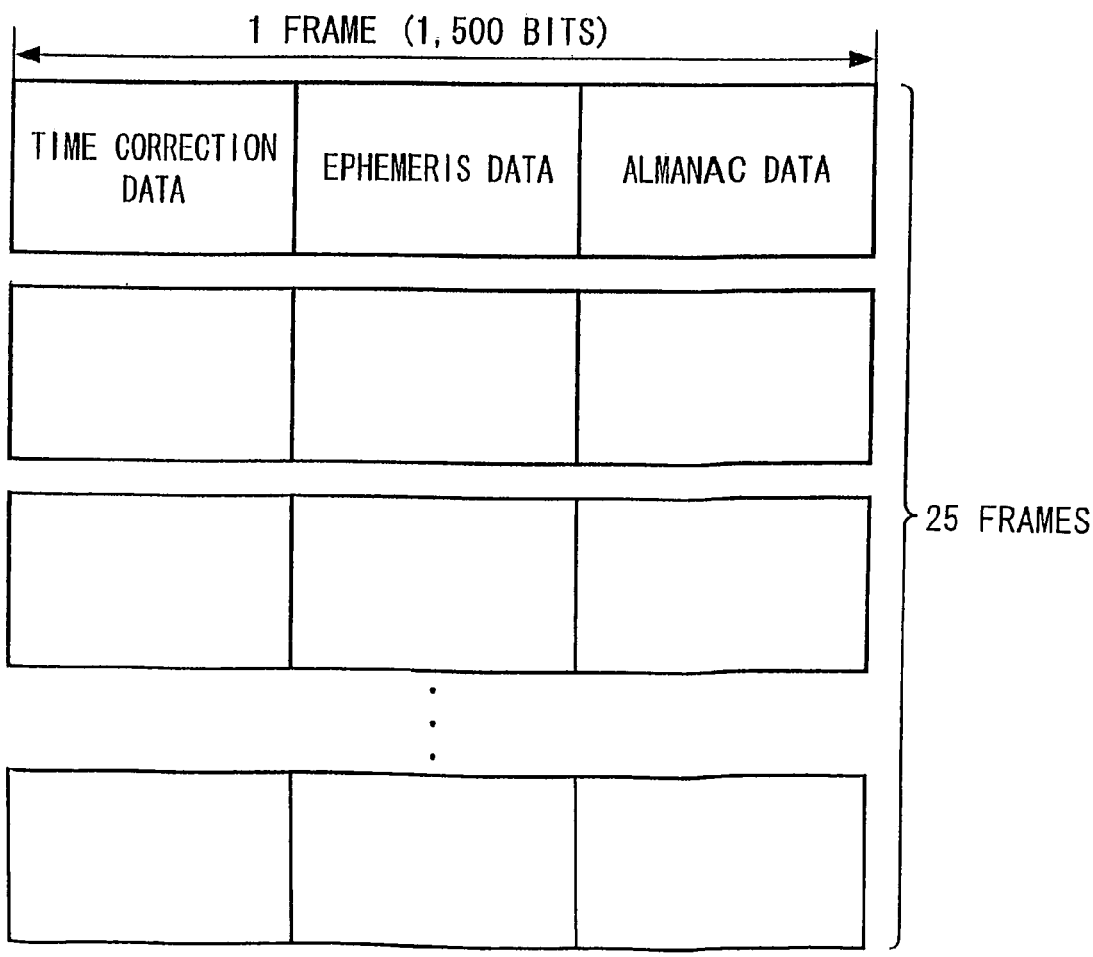

POSITION MEASURING METHOD AND MOBILE COMMUNICATION TERMINAL

TECHNICAL FIELD

The present invention relates to a method for measuring positions of a mobile communication terminal, a mobile communication terminal, a program and a storage medium for storing the program.

BACKGROUND ART

A Global Positioning System (GPS) is known as a system that can be used for measuring a position of a terminal. Currently about 20 GPS satellites are in operation, each of which transmits a navigation message(s). As shown in FIG. 10, a navigation message contains various data such as, time correction data, ephemeris data and almanac data. Ephemeris data from a GPS satellite indicates a precise orbit of the GPS satellite, and almanac data indicates approximate orbits of all GPS satellites.

As shown in FIG. 11, GPS satellites move in different orbits around the earth. Consequently, a terminal 1 is not able to simultaneously receive radio signals from all GPS satellites. Namely, a radio signal that the terminal is able to receive from a GPS satellite is dependent on a current position of the terminal.

In the example shown in FIG. 11, terminal 1 is able to receive radio signals from GPS satellites 4-2 to 4-5 when it is located in area 5-1; and is able to receive radio signals from GPS satellites 4-3 to 4-6 when it is located in area 5-2. These GPS satellites from which terminal 1 can receive radio signals are referred to as "GPS satellites in the visible area" for terminal 1.

A terminal 1 with GPS function receives radio signals from two or more GPS satellites respectively, computes distances from the GPS satellites on the basis of the navigation messages included in the radio signals, and thereby measures the position of the terminal. This measurement operation will be referred to as a "position measurement operation."

A specific measurement operation carried out by terminal 1 will now be described below referring to FIG. 11, taking a case where terminal 1 is positioned in area 5-1 as an example. First, terminal 1 receives navigation messages from one of the GPS satellites 4 (e.g. GPS satellite 4-2), and extracts almanac data from the received navigation messages.

Next, terminal 1 determines the GPS satellites in the visible area for terminal 1 on the basis of the almanac data. In this example, GPS satellites 4-2 to 4-5 are determined as the GPS satellites in the visible area for terminal 1.

Next, terminal 1 tunes into GPS satellites 4-2 to 4-5 in the visible area, and receives navigation messages from GPS satellites 4-2 to 4-5, respectively.

Then terminal 1 computes distances between terminal 1 and each one of the satellites 4-2 to 4-5 on the basis of ephemeris data included in the navigation messages, and measures the position of the terminal.

Each GPS satellite transmits a navigation message at a transmission rate of 50 bps. The navigation message consists of 25 frames as shown in FIG. 10, while each frame consists of 1,500 bits. Therefore, a time of 750 seconds (1,500 bits× 25/50 bps) is required to receive the complete navigation message. Thus, a time taken by terminal 1 to receive a navigation message is relatively long at the commencement of a position measurement operation; and terminal 1 must then extract almanac data from the navigation message. As a result, terminal 1 suffers from a drawback in that it is not convenient to use since a position measurement operation that it carries out takes a relatively long time.

SUMMARY OF INVENTION

The present invention provides a method for measuring a position of a mobile communication terminal that is accommodated in a mobile communication network, comprising: specifying a residency area where the mobile communication terminal resides; determining, on the basis of the residency area, whether the mobile communication terminal has moved a predetermined distance; obtaining a position of the mobile communication terminal and storing the obtained position as an approximate position in a memory of the mobile communication terminal, each time it is determined that the mobile communication terminal has moved the predetermined distance; reading out the approximate position from the memory and transmitting the approximate position form the mobile communication terminal to a server through the mobile communication network, each time a precise position of the mobile communication terminal is required; obtaining at the server a position measurement assist-data corresponding to the approximate position when the approximate position is received by the server; and measuring a position of the mobile communication terminal that is more precise than the approximate position, by use of the position measurement assist-data.

The present invention provides a method for measuring a position of a mobile communication terminal accommodated in a mobile communication network, including:

a first step for determining whether the mobile communication terminal has moved a predetermined distance;

a second step for measuring a position of the mobile communication terminal and storing the position as an approximate position of the mobile communication terminal, each time it is determined in the first step that the mobile communication terminal has moved the predetermined distance;

a third step for selecting a plurality of satellites on the basis of the stored approximate position, and receiving radio signals from the selected satellites; and a fourth step for measuring a position of the mobile communication terminal by using data included in the received radio signals. For convenience, this method will be referred to as a first position measurement method.

The present invention provides a method for measuring a position of a mobile communication terminal that is accommodated in a mobile communication network, including:

a first step for determining whether the mobile communication terminal has moved a predetermined distance;

a second step for measuring a position of the mobile communication terminal and for storing the position as an approximate position of the mobile communication terminal, each time it is determined in the first step that the mobile communication terminal has moved the predetermined distance;

a third step for selecting on the basis of the stored approximate position a plurality of satellites, and receiving radio signals from the selected satellites;

a fourth step for transmitting data included in the radio signals through the mobile communication network to a server; and a sixth step for receiving a position of the mobile communication terminal, which position is calculated and transmitted by the server on the basis of the data. For convenience, the method will be referred to as a second position measurement method.

In the first or second position measurement method, the mobile communication network is configured to be provided in a plurality of areas; the first step may also include a seventh step for detecting a residency area in which the mobile communication terminal currently resides; and an eighth step for determining, on the basis of the detected residency area, whether the mobile communication terminal has moved the predetermined distance. For convenience, these methods will be referred to as third position measurement methods.

In the third position measurement methods, the number of changes in the residency areas is counted in the eighth step. On the basis of the number of changes counted, it can be determined whether the mobile communication terminal has moved the predetermined distance. Alternatively, a number of changes without duplication in the residency areas may be counted in the eighth step. Then, on the basis of the number of changes, it can be determined whether the mobile communication terminal has moved the predetermined distance. For convenience, these methods will be referred to as fourth and fifth position measurement methods respectively.

In the third position measurement methods, the area consists of one or a plurality of cells, and a base station corresponding to each cell executes radio communication with the mobile communication terminal. Then, on the basis of area identification data transmitted from the base station the residency area can be detected. For convenience, these methods will be referred to as sixth position measurement methods.

In the sixth position measurement methods, the area identification data includes data for determining a movement distance of the mobile communication terminal. Then, on the basis of the data for determining movement distance, which data is included in the area identification data transmitted from the base station, it can be determined in the eighth step whether the mobile communication terminal has moved the predetermined distance. For convenience, these methods will be referred to as seventh position measurement methods.

In the first to seventh position measurement methods, on the basis of radio signals received from the satellite in the first step, a position of the mobile communication terminal can be measured by said mobile communication terminal alone. For convenience, these methods will be referred to as eight position measurement methods.

In the first to eighth position measurement methods, the third step may further include the steps of:

transmitting the stored approximate position through the mobile communication network to a server;

receiving a position measurement assist-data transmitted from the server in accordance with the approximate position; and selecting the plurality of satellites assigned by the position measurement assist-data.

The present invention provides a mobile communication terminal which is accommodated in a mobile communication terminal, having:

first means for determining whether the mobile communication terminal has moved a predetermined distance;

second means for measuring a position of the mobile communication terminal and for storing the position as an approximate position of the mobile communication terminal, each time it is determined by said first means that the mobile communication terminal has moved the predetermined distance;

third means for selecting a plurality of satellites selected on the basis of the stored approximate position and receiving radio signals from the selected satellites; and fourth means for measuring a position of the mobile communication terminal by using data included in the received radio signals. For convenience, this mobile communication terminal will be referred to as a first mobile communication terminal.

The present invention provides a mobile communication terminal, having:

first means for determining whether the mobile communication terminal has moved a predetermined distance;

second means for measuring a position of the mobile communication terminal and for storing the position as an approximate position of the mobile communication terminal, each time it is determined by said first means that the mobile communication terminal has moved the predetermined distance;

third means for selecting a plurality of satellites selected on the basis of the stored approximate position, and receiving radio signals from the selected satellites;

fifth means for transmitting the data included in the radio signals through a mobile communication network to a server; and sixth means for receiving a position of the mobile communication terminal calculated and transmitted by the server in accordance with the data. This mobile communication terminal will be referred to as a second mobile communication terminal, for convenience.

In the first or second mobile communication terminal, the mobile communication network is configured to be provided in a plurality of areas, and the first means may further include:

seventh means for detecting an area where the mobile communication terminal resides; and eighth means for determining, on the basis of the detected residency area, whether the mobile communication terminal has moved the predetermined distance. For convenience, in such a case the term third mobile communication terminal will be used.

In the case of a third mobile communication terminal the eighth means counts a number of changes in the residency areas, and on the basis of the number of the changes counted, it can be determined, whether the mobile communication terminal has moved the predetermined distance. Alternatively, the eighth means counts a number of changes without duplication in the residency areas, and then determines, on the basis of the number of changes, whether the mobile communication terminal has moved the predetermined distance. For convenience, in such a case the terms fourth and fifth mobile communication terminals will be used.

In the case of a third mobile communication terminal, the area consists of one or a plurality of cells. A base station corresponding to each cell executes radio communication with the mobile communication terminal. On the basis of area identification data transmitted from the base station the seventh means is able to further detect a residency area. For convenience, in such a case the term sixth mobile communication terminal will be used.

In the case of a sixth mobile communication terminal, the area identification data includes data for determining a movement distance of the mobile communication terminal. Then the eighth means may further determine whether the mobile communication terminal has moved the predetermined distance, by referring data for determining movement distance included in the area identification data transmitted from the base station. For convenience, in such a case the term seventh mobile communication terminal will be used. In the case of first to seventh mobile communication terminals, the first means alone may further measure a position of the mobile communication terminal on the basis of the radio signals received from the satellites. For convenience, in such a case the term eighth mobile communication terminal will be used.

In the case of first to eighth mobile communication terminals, the third means may further include:

means for transmitting the stored approximate position through the mobile communication network to a server;

means for receiving a position measurement assist-data transmitted from the server in accordance with the approximate position; and means for selecting the plurality of satellites assigned by the position measurement assist-data.

The present invention provides a program for causing a computer, which is equipped in a mobile communication terminal accommodated in a mobile communication network, to execute functions of:

a first function for determining whether the mobile communication terminal has moved a predetermined distance;

a second function for measuring a position of the mobile communication terminal and for storing the position as an approximate position of the mobile communication terminal, each time it is determined by the first function that the mobile communication terminal has moved the predetermined distance;

a third function for selecting a plurality of satellites selected on the basis of the stored approximate position and for controlling a receiver circuit to receive radio signals from the selected satellites;

a fourth function for measuring a position of said mobile communication terminal by using data included in the received radio signals. For convenience, this program will be referred to as a first program.

In the case of a first program, the mobile communication network is configured to be provided in a plurality of areas; the first function may further include:

a fifth function for detecting a residency area where the mobile communication terminal resides;

a sixth function for determining, on the basis of the detected residency area, whether the mobile communication terminal has moved the predetermined distance. For convenience, this program will be referred to as a second program.

The present invention provides a computer readable storage media for storing the first or second program.

BRIEF DESCRIPTION OF THE DRAWINGS

FIG. 9 is a drawing exemplifying a counting table in a modification.

FIG. 10 is a drawing showing a data format of a navigation message which a GPS satellite transmits.

BEST MODE FOR CARRYING OUT THE INVENTION

A. FIRST EMBODIMENT

A-1. Configuration

Figure 1:
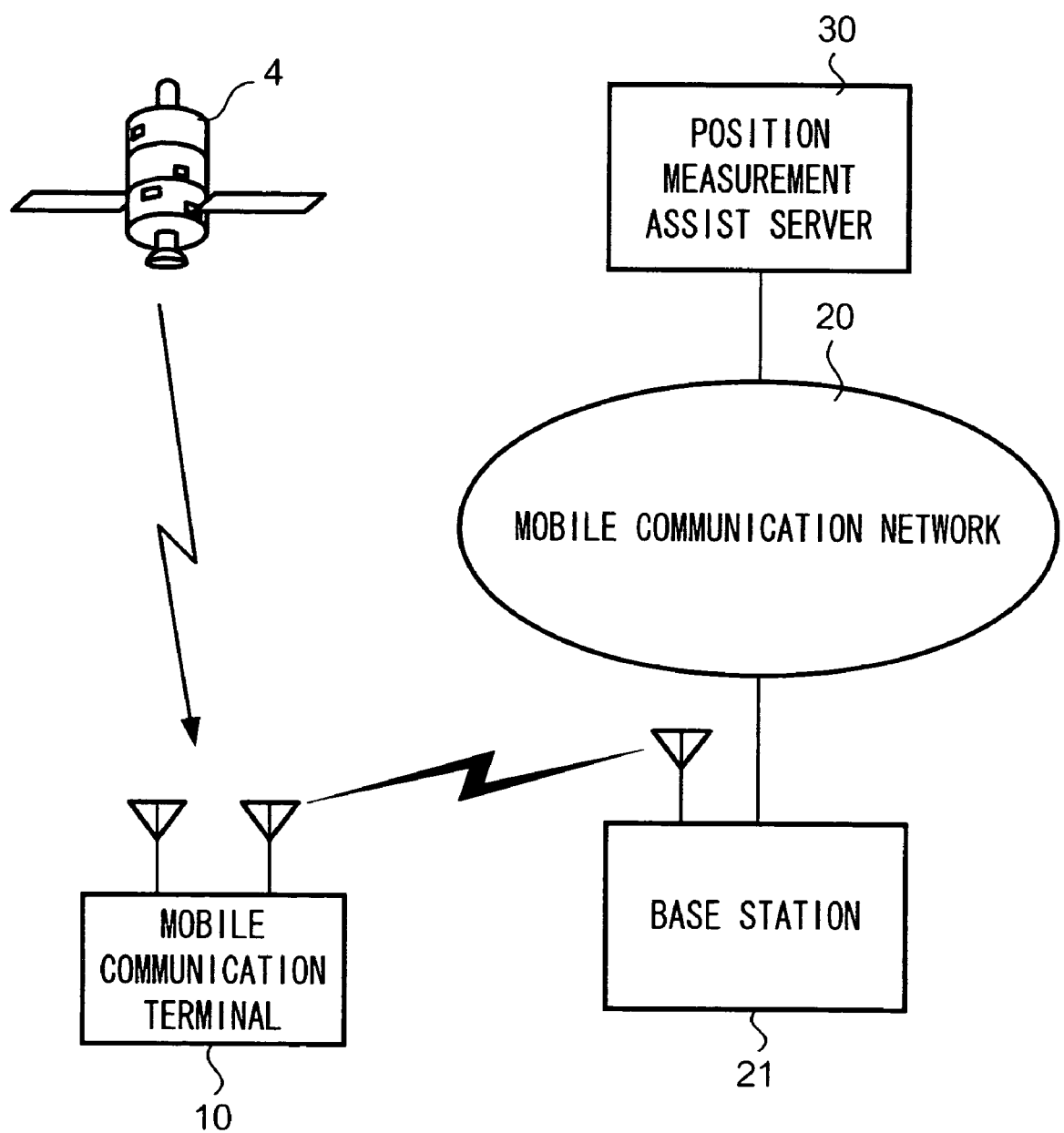
FIG. 1 is a chart showing the entire system according to the first embodiment.

A configuration according to the first embodiment of the present invention will now be described referring to the drawings.

(1) Entire Configuration of the System

FIG. 1 is a diagram illustrating the entire system according to the first embodiment of the present invention. As shown, the system includes mobile communication network 20, mobile communication terminal 10 accommodated in mobile communication network 20, and position measurement assist server 30 connected to mobile communication network 20. Mobile communication network 20 includes a plurality of base stations 21, provided at predetermined distances from one another, a switch (not shown) for performing circuit switching in network 20, home memory (not shown), and communication links that connect base stations 21, the switch and the home memory to each other.

Base station 21 is provided to form a radio cell having a diameter of between several hundred meters to several kilometers. A position registration area is formed by grouping together a predetermined number of radio cells. Each of base stations 21 located within a position registration area transmits a broadcast message to a radio cell of the base station 21. A broadcast message includes position registration area ID that is unique to a position registration area. Mobile communication terminal 10 transmits a position registration request to mobile communication network 20, each time mobile communication terminal 10 receives a new position registration area ID. Then, a position is registered in the home memory in response to the request. Therefore, the position of the mobile communication terminal 10 can be known by referring to the home memory.

Mobile communication terminal 10 is a terminal such as a cellular phone or Personal Digital Assistants (PDA). Mobile communication terminal 10 has a GPS position measurement function for tuning into radio signals emitted from a plurality of GPS satellites, and for measuring its own position on the basis of navigation data included in the received radio signals; and also a communication function for performing data communication through mobile communication network 20 with position measurement assist server 30 by a method such as Time Division Multiple Access (TDMA) or Code Division Multiple Access (CDMA). Mobile communication terminal 10 performs stand-alone position measurement by using the GPS function of the terminal. Alternatively, mobile communication terminal 10 performs network position measurement in cooperation with position measurement assist server 30, in addition to the terminal performing a GPS function. Further, mobile communication terminal 10 functions to provide to a user services such as navigation, by using the position obtained in the position measurement.

Position measurement assist server 30 assists mobile communication terminal 10 in performing a network position measurement in cooperation with the GPS function of mobile communication terminal 10, in a case that mobile communication terminal 10 performs a network position measurement. Position measurement assist server 30 provides mobile communication terminal 10 with position measurement assist-data, such as satellite capture data for expressing GPS satellites in a visible area for mobile communication terminal 10, and a Doppler shift for expressing delay conditions of radio signals, and also correction data for correcting errors in a stand-alone position measurement.

Mobile communication terminal 10 is able to perform position measurement more rapidly and precisely by using the position measurement assist-data, as compared to stand-alone position measurement.

Since mobile communication terminal 10 does not receive position measurement assist-data in a stand-alone position measurement, precision of position measurement is lower than that in network position measurement.

(2) Principles of Operation

A principle of operation of the present embodiment will now be described below.

Position measurement assist-data that is used to a network position measurement are dependent on an approximate position of mobile communication terminal 10. For example, it is known that mobile communication terminal 10 has moved a distance of around 150 kilometers, GPS satellites 4 in the visible area for mobile communication terminal 10 are not the same as those in the visible area before the movement. Alternatively, if the movement range of mobile communication terminal 10 is not greater than 150 kilometers, network position measurement can be performed by using the same GPS satellites 4, namely, the same position measurement assist-data.

In the present embodiment, mobile communication terminal 10 notifies its own rough position to position measurement assist server 30, and performs network position measurement on the basis of position measurement assist-data provided from position measurement assist server 30, and in accordance with the notification.

Figure 2:
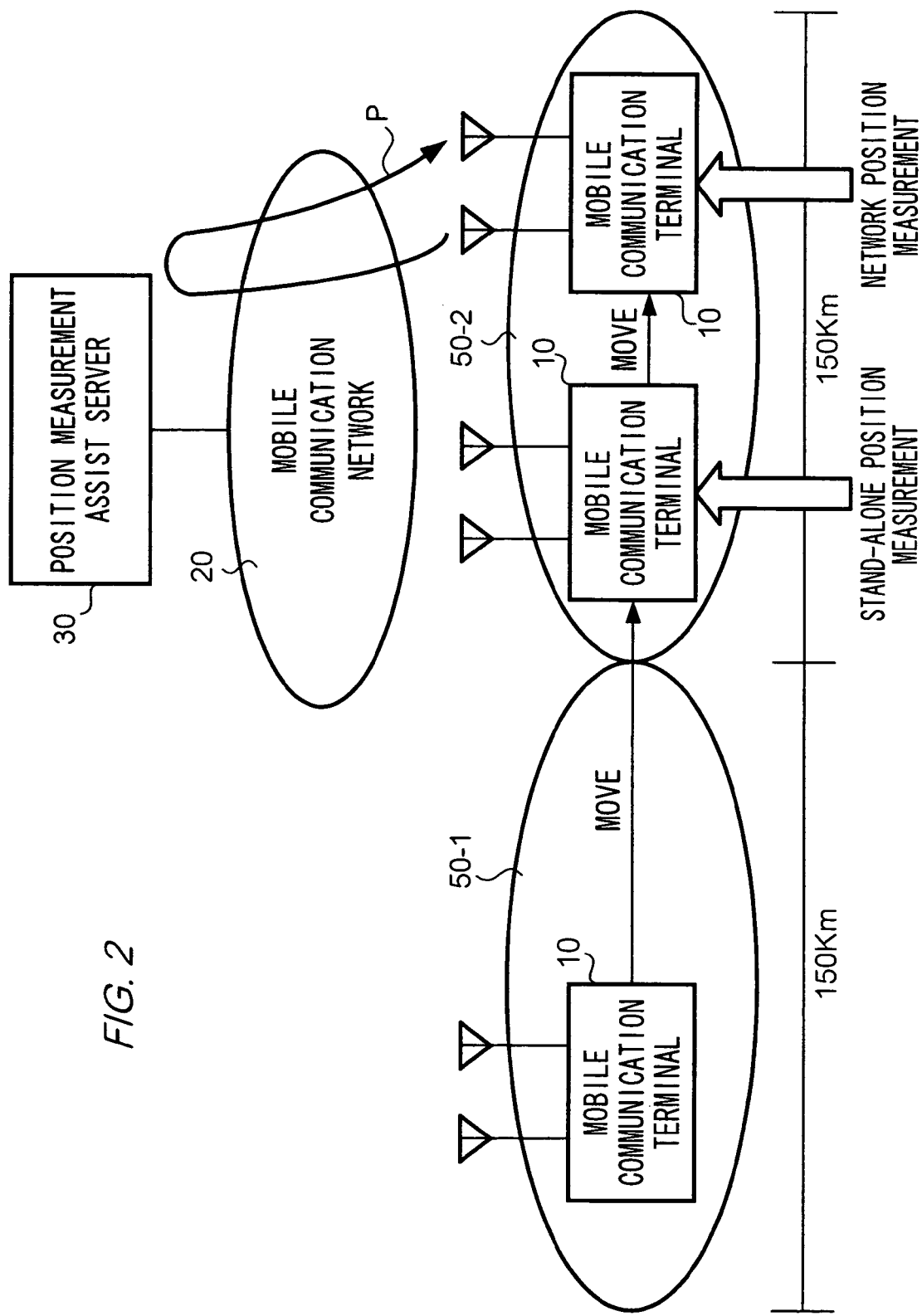
FIG. 2 is a chart explaining how GPS position measurement is carried out in the same embodiment.

Referring to FIG. 2, one principle of operation will now be described below.

Mobile communication terminal 10 measures its own position by performing a stand-alone position measurement each time mobile communication terminal 10 moves 150 kilometers(50-1), and stores the stand-alone position measurement until mobile communication terminal 10 moves another 150 kilometers (50-2) from the measured point. For example, as illustrated in FIG. 2, the mobile communication terminal 10 may measure and store a first stand-alone position measurement within a first area 50-1, and measure and store a second stand-alone position measurement upon moving into a second area 50-2. This enables mobile communication terminal 10 to maintain its own position, which is necessary to obtain position measurement assist-data from position measurement assist server 30. However, the position obtained by the stand-alone position measurement will include a degree of error, since the position has not been corrected on the basis of position measurement assist-data. The position obtained by the stand-alone position measurement will be referred to as an "approximate position", expressing approximate position of mobile communication terminal 10.

If precise position measurement is required, such as in a case when the navigation operation is selected by user operation, mobile communication terminal 10 performs the network position measurement by using the stored approximate position. In the example of FIG. 2 mobile communication terminal 10 transmits the stored approximate position to position measurement assist server 30 as denoted by the arrow P, and receives position measurement assist-data transmitted from position measurement assist server 30 in accordance with the approximate position.

Position measurement assist server 30 generates position measurement assist-data in accordance with the approximate position of mobile communication terminal 10. Position measurement assist server 30, for example, determines GPS satellites 4 in the visible area for mobile communication terminal 10, by using a known art, on the basis of positions of GPS satellites deduced from the approximate position of mobile communication terminal 10 and almanac data. It is sufficient to know the approximate position obtained by a stand-alone position measurement as described above, since it is not necessary to obtain a particularly precise position to generate position measurement assist-data.

Mobile communication terminal 10 receives radio signals in sync with GPS satellites 4 indicated in the satellite capturing data included in the position measurement assist-data, and measures its own position. Mobile communication terminal 10 computes its own precise position by using Doppler shift data and correction data described above, and the like.

Thus, stand-alone position measurement is used for preparing an approximate position for network position measurement. Mobile communication terminal 10 does not need to provide services such as a navigation, which is based directly on a position obtained by the stand-alone position measurement. Low precision measurement in stand-alone measurement, therefore, does not matter.

In the present embodiment stand-alone position measurement or network position measurement are used depending on the purpose of obtaining a position measurement.

Figure 3:
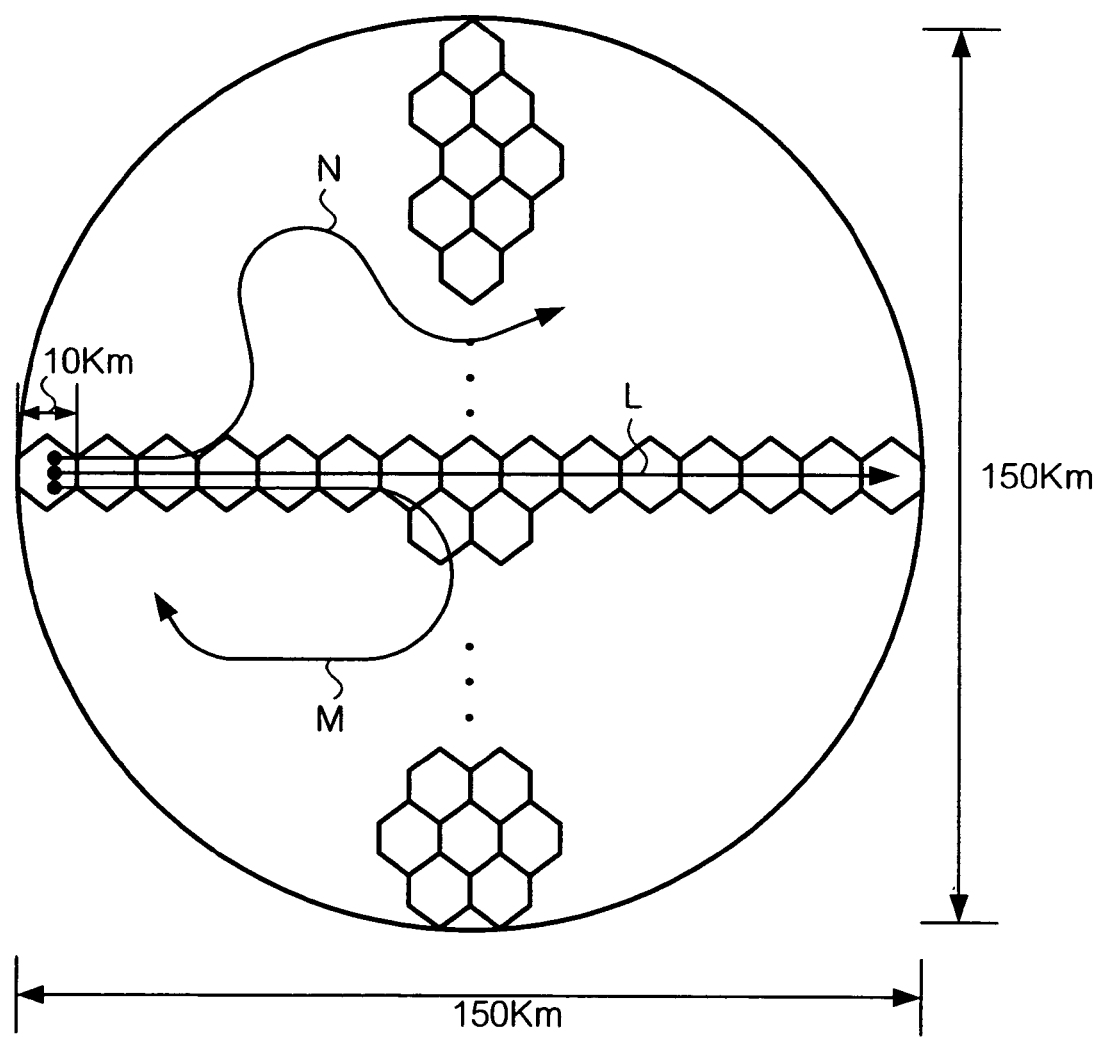
FIG. 3 is a chart explaining how to determine a movement distance of a mobile communication terminal in the same embodiment.

Referring to FIG. 3., it will now be described below how to detect whether mobile communication terminal 10 has moved 150 kilometers.

FIG. 3 is a plan chart showing an over view of a plurality of position registration areas. Since each position registration area has a size of 10 kilometers in diameter as described above, the end to end length of the rows of 15 position registration area when arranged in a line is equal to around 150 kilometers. If mobile communication terminal 10, for example, moves linearly as denoted by arrow L and the position registration area where the mobile communication terminal 10 resides change 15 times, it is determined that the mobile communication terminal 10 has moved linearly by around 150 kilometers. Alternatively, if mobile communication terminal 10 moves along a curve as denoted by arrow M or N, the linear travel distance is shorter than 150 kilometers. However, in this case it may be determined that the mobile communication terminal 10 has moved around 150 kilometers at the moment the position registration area change 15 times. Because, once mobile communication terminal 10 has obtained its own position by performing stand-alone position measurement, mobile communication terminal 10 is able to immediately perform network position measurement as requested in excess of processing of stand-alone position measurement.

(3) Configuration of Mobile Communication Terminal 10

Figure 4:
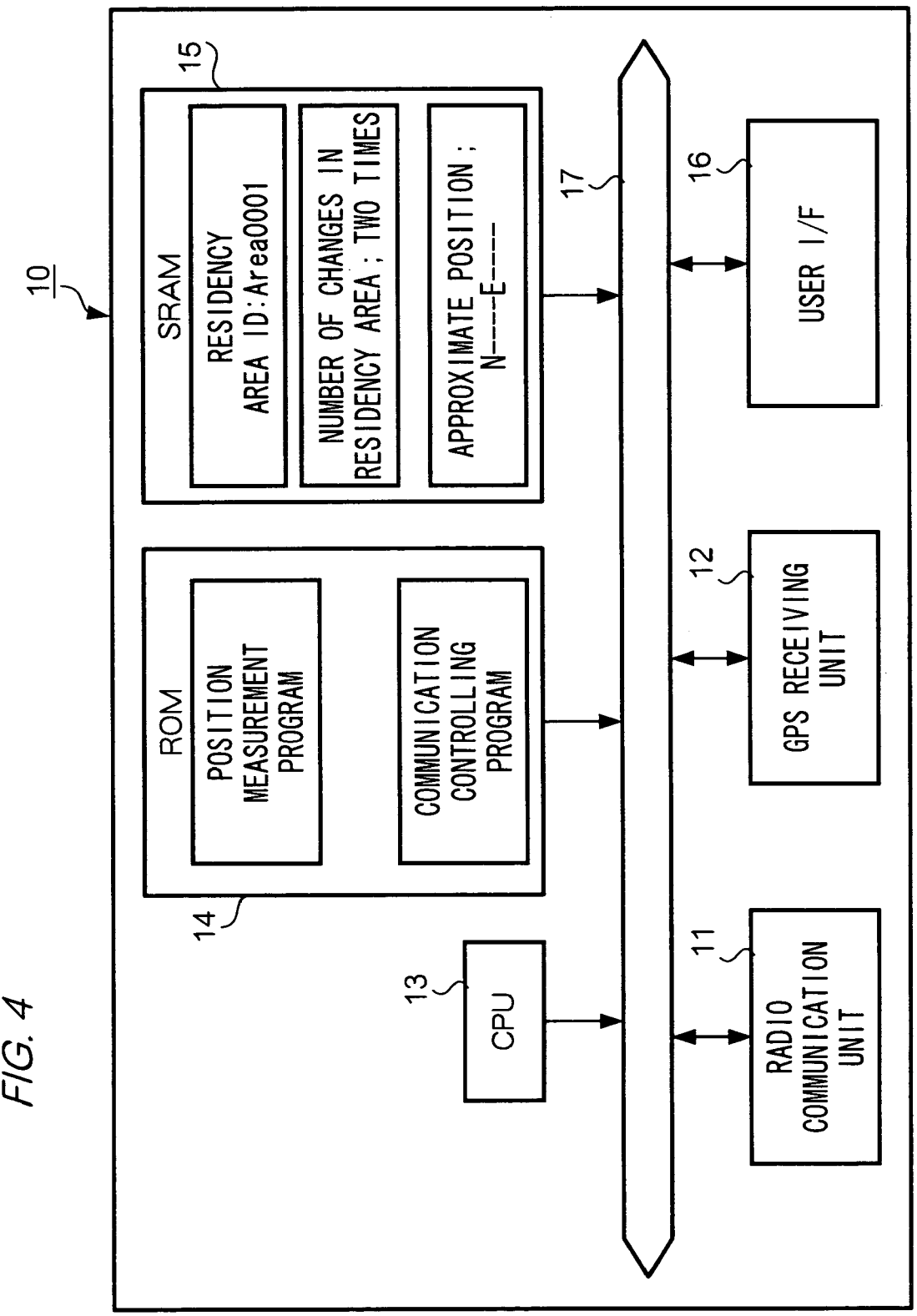
FIG. 4 is a block diagram showing the configuration of a mobile communication terminal in the same embodiment.

Referring to FIG. 4, a configuration of mobile communication terminal 10 will now be described below.

Mobile communication terminal 10 consists of radio communication unit 11, GPS receiving unit 12, Central Processing Unit (CPU) 13, Read Only Memory (ROM) 14, Static Random Access Memory (SRAM) 15, user interface unit 16, and bus 17 for connecting these respective units to one other.

Radio communication unit 11 is provided with an antenna and communication control circuits (not shown), and performs radio communication with base station 21 of mobile communication network 20.

GPS receiving unit 12 is provided with a GPS antenna and receiving circuits (not shown) receives radio signals from GPS satellites 4, and provides the received radio signals to CPU 13 through bus 17.

ROM 14 stores control programs. The programs include a program for performing position measurement on the basis of navigation messages received from GPS satellites; a program for performing data communication with position measurement assist server 30; a program for providing user with a navigation service; and the like. CPU 13 reads the control programs from ROM 14, and controls each unit of mobile communication terminal 10 by executing the control programs.

SRAM 15 stores an ID of each position registration area received from base station 21 by mobile communication terminal 10 (referred to as a residency area ID, and a residency area, respectively, below), a number of changes in the residency area, and an approximate position obtained by stand-alone position measurement. SRAM 15 also has battery backup, and thus is able to retain its content in a case that mobile communication terminal 10 is powered down. In the example shown in FIG. 4, contents of SRAM 15 show that residency area ID is "AREA00001", and an approximate position is "N - - - E - - -."

User interface unit 13 consists of a liquid crystal display for displaying a variety of information; a keypad that a user employs to perform a variety of input operations; a microphone; and a speaker for inputting and outputting voices, respectively, and the like.

A-2: Operation (1) Process for Obtaining an Approximate Position

Referring to the flowchart shown in FIG. 5, a process for obtaining an approximate position in accordance with the present embodiment will now be described.

Figure 5:
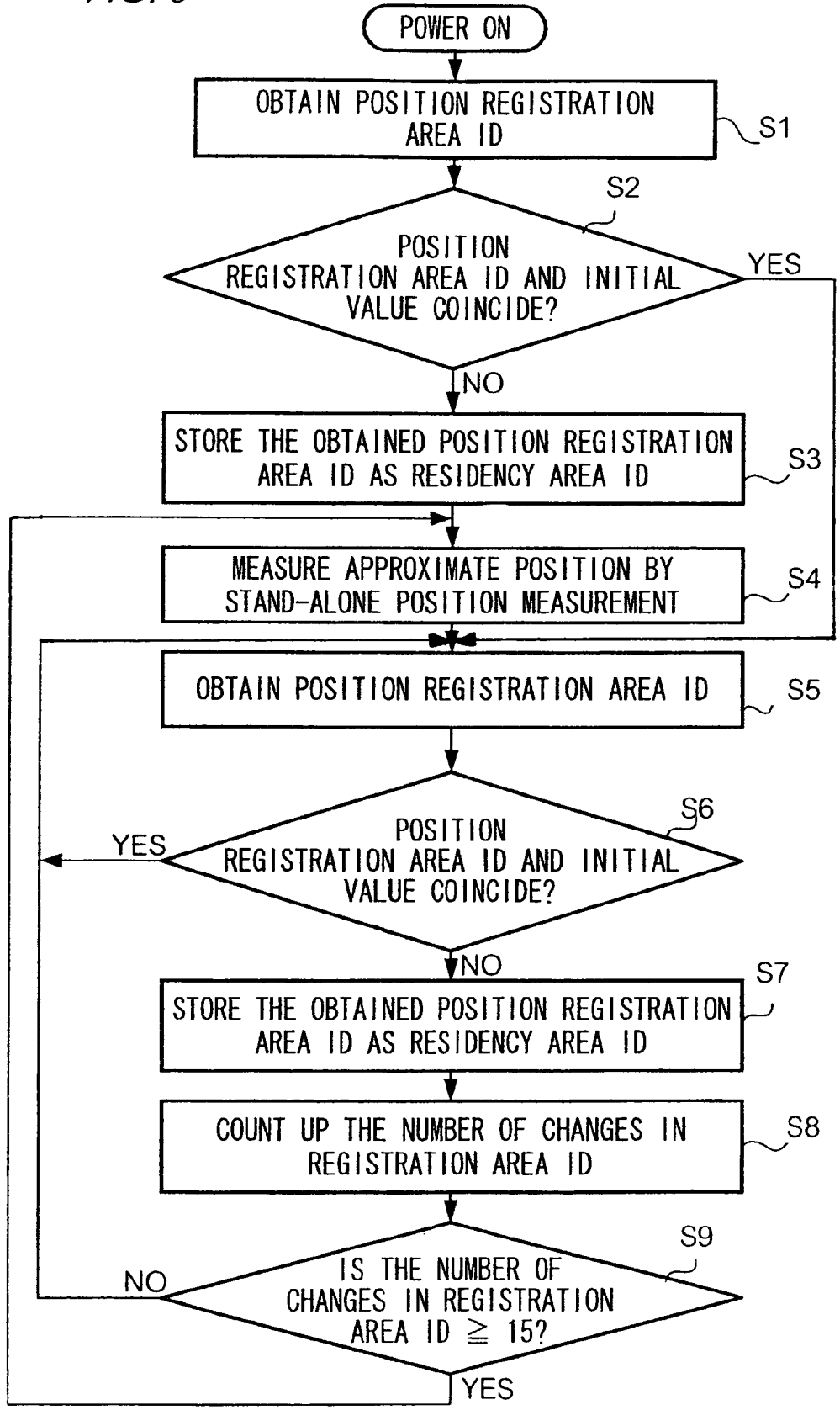
FIG. 5 is a flowchart showing an operation of the CPU of a mobile communication terminal in the same embodiment.

When mobile communication terminal is powered on, CPU 13 starts the operation shown in FIG. 5. The residency area ID stored in SRAM 15 at the moment of powering on is the same as an ID of the position registration area in which mobile communication terminal 10 resided at the time of powering off, (in this example, "AREA0002"). Accordingly, the approximate position stored in SRAM 15 is the same as the approximate position stored in SRAM 15 at the time of powering off. The initial value of a number of changes in the residency area is thus set to "0".

Radio communication unit 11 receives a broadcast message transmitted from base station 21, and detects a position registration area ID (in this example "AREA0001") included in the broadcast message. Radio communication unit 11 provides the detected position registration area ID through bus 17 to CPU 13. CPU 13 obtains a position registration area ID of position registration area where mobile communication terminal 10 resides at the time of powering up (step S1).

CPU compares the residency area ID, "AREA0002" and the position registration area ID obtained in step S1, "AREA0001", and determines if the IDs coincide(step S2).

In this example, since they differ (step S2: No), operation of CPU 13 advances to step S3 so as to obtain a new approximate position.

Alternatively, if in step S2 the residency area ID, "AREA0002" and the position registration area ID obtained in step S1 coincide, the operation of CPU 13 advances to step S5 described below, since there is no need to obtain a new approximate position.

CPU 13 overwrites the old residency area ID in SRAM 15 with the position registration area ID obtained in step S1, "AREA0001", as a new residency area ID (step S3).

CPU 13 measures a position of the mobile station by using stand-alone position measurement, and overwrites the old approximate position in SRAM 15 with the measured latitude and longitude as a new approximate position (step S4).

Each time radio communication unit 11 receives a periodic broadcast message transmitted from base station 21, CPU 13 repeats the processes of steps 5 to 9, as described below.

Radio communication unit 11 receives a broadcast message transmitted from base station 21, detects position registration area ID included in the received broadcast message, and provides the detected position registration area ID (for example, "AREA0003") through bus 17 to CPU 13 (step S5).

CPU 13 compares the position registration area ID obtained in step S1, "AREA0001" and the position registration area ID obtained in step S5, "AREA003", and determines if these IDs coincide (step S6).

Since, in this example, they differ (step S6: No), CPU 13 overwrites the old residency area ID in SRAM 15 with the position registration area ID obtained in step S5, "AREA0003", as a new residency area ID (step S7).

CPU 13 counts up a number of changes in position registration area in SRAM 15 by an amount of one (step S8). Thus, in this case, the number of changes in position registration area changes from "0" to "1".

CPU 13 determines if the number of changes in position registration area in SRAM 15 is greater than 14 (step S9). In this case, the number of changes in position registration area is 1 and, therefore, smaller than 15 (step S9: No), so that CPU 13 executes step S5. CPU 13 then again executes the processes in accordance with steps S5 to S9, described above.

After repeating the processes in accordance with steps S5 to S9 (step S9: Yes), and the number of changes in position registration areas reaches 15, the number of changes in position registration area is cleared to "0". CPU 13 then executes step S4.

CPU 13 again measures its own approximate position by using stand-alone position measurement, and stores the approximate position in SRAM 15.

Mobile communication terminal 10, by performing stand-alone position measurement, and storing its own approximate position every 15 times residency area ID is changed, is able to continually record its approximate position, so as to be able to perform network position measurement, as described below.

(2) Network Position Measurement

Figure 6:
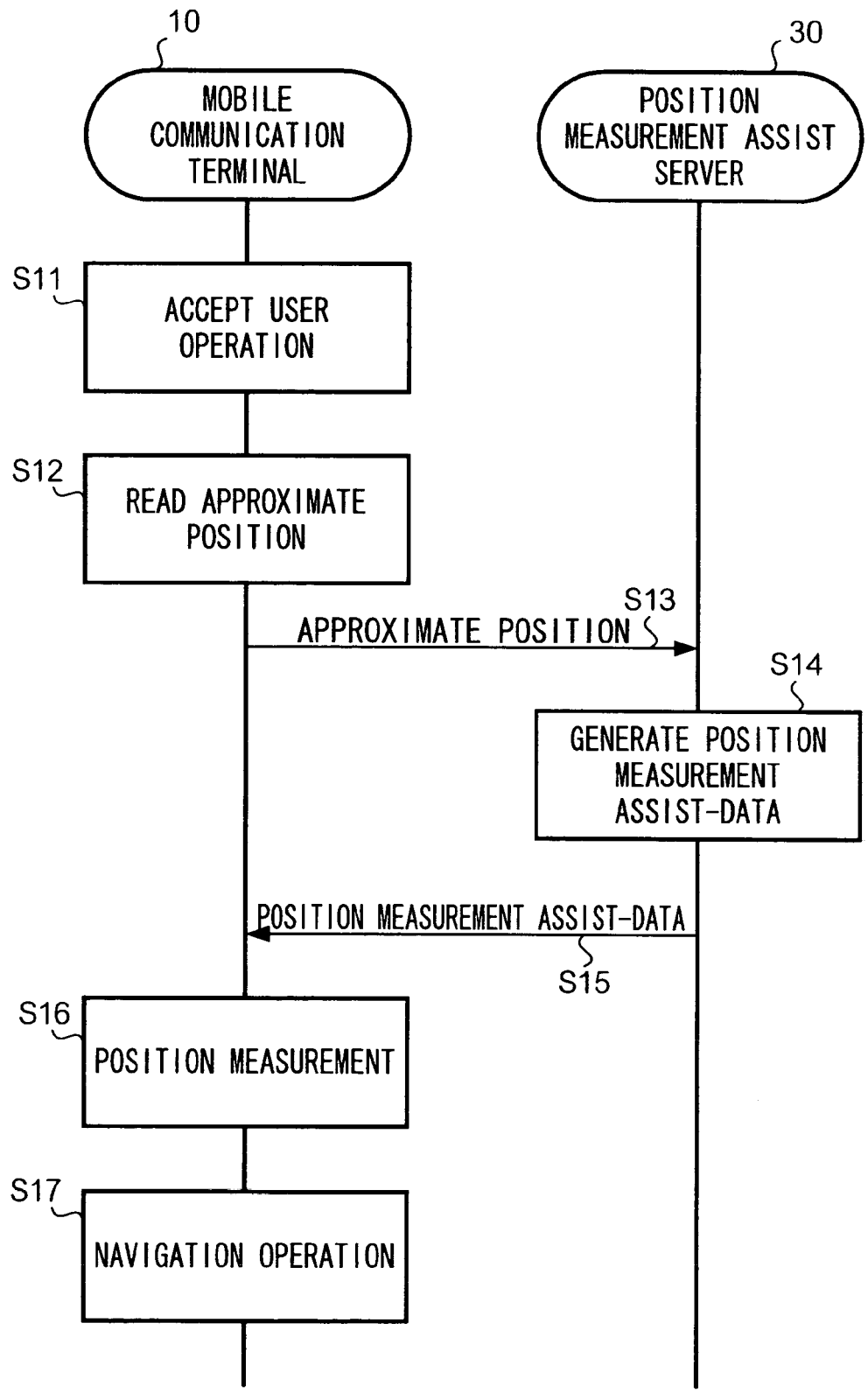
FIG. 6 is a sequence diagram showing operations of a mobile communication terminal and a position measurement assist server according to the same.

In the following with reference to the sequence diagram shown in FIG. 6, it is explained how a network position measurement is performed in a case that mobile communication terminal 10 provides a navigation service.

Using the keypad of mobile communication terminal 10, a user instructs a start of navigation service (step S11).

Mobile communication terminal 10 reads an approximate position stored in SRAM 15 (step S12), and requests position measurement assist server 30 to provide position measurement assist-data by transmitting the approximate position through mobile communication network 20 to position measurement assist server 30 (step S13).

On receiving the approximate position, position measurement assist server 30 generates position measurement assist-data in accordance with the approximate position (step S14), and transmit the position measurement assist-data through mobile communication network 20 to mobile communication terminal 10 (step S15).

On receiving position measurement assist-data, mobile communication terminal 10 measures its own position on the basis of the position measurement assist-data (step S16).

Mobile communication terminal 10 displays, on the basis of the measured longitude and latitude, an image overlapping a current position or a route to a destination in a liquid crystal display (LCD) screen, to provide a navigation service to the user (step S17).

As shown in the first embodiment, a position can be rapidly obtained when providing services that make use of position information. Thus, such services can be smoothly provided.

B. SECOND EMBODIMENT

The second embodiment of the present invention is described below. The configuration of the second embodiment is common with that of the first embodiment. The operation of the second embodiment differs from that of the first embodiment in that when mobile communication terminal 10 is powered off, a residency area ID and an approximate position stored in SRAM 15 are cleared. As a result, when mobile communication terminal 10 is powered on it obtains its own position by performing stand-alone position measurement.

Figure 7:
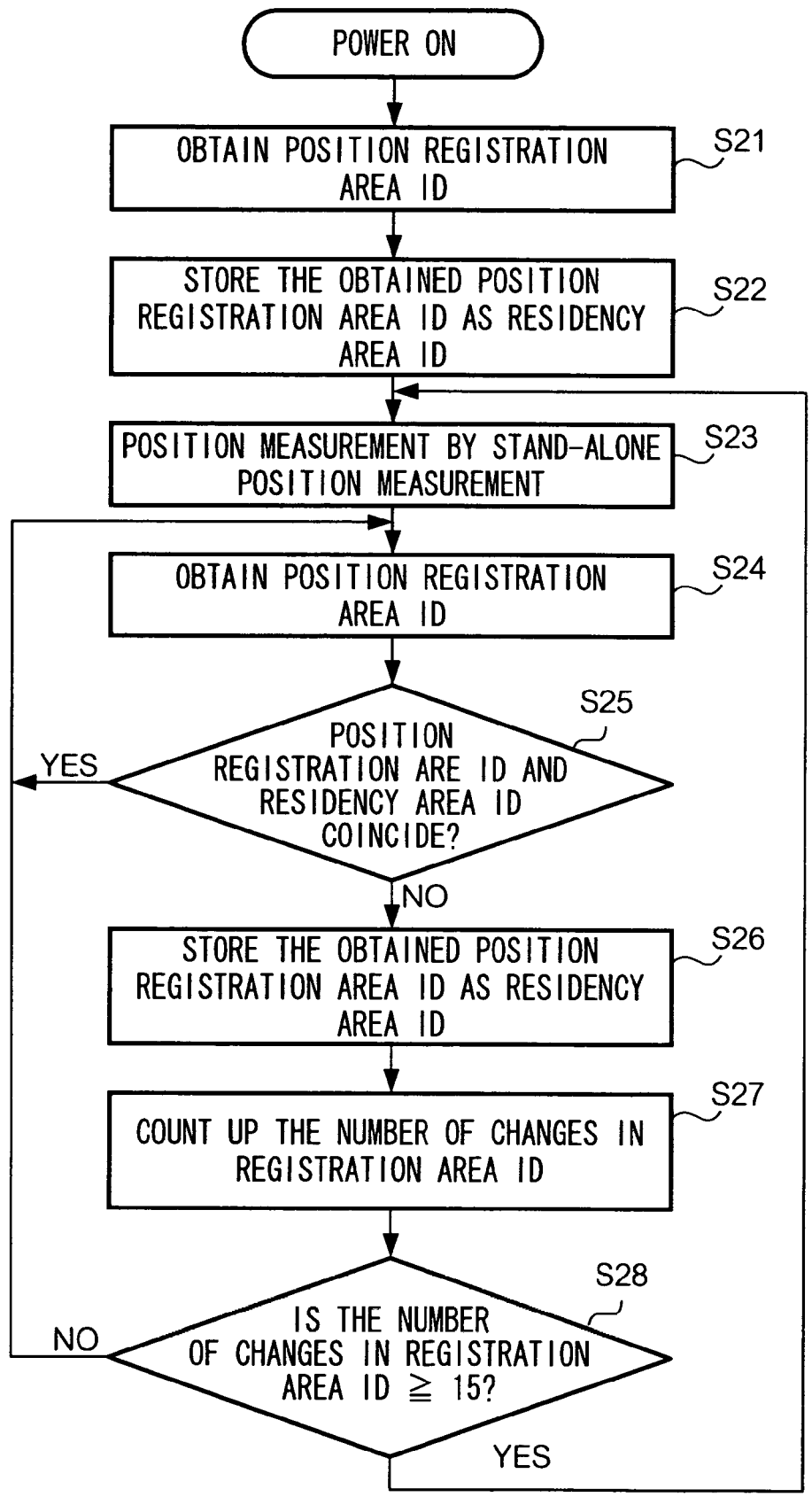
FIG. 7 is a flowchart showing an operation of CPU of a mobile communication terminal according to the second embodiment.

Referring to FIG. 7, there will be described below an operation according to the second embodiment for obtaining an approximate position.

In the operation illustrated in FIG. 7, when mobile communication terminal 10 is powered on, CPU 13 starts, and an initial value of a residency area ID stored in SRAM 15 is set to "0"; an initial value of an approximate position stored in SRAM 15 is set to "0"; and an initial value of number of changes in the residency area is set to "0".

Radio communication unit 11 receives a broadcast message transmitted from base station 21, and detects a position registration ID (in this case, "AREA0001" is chosen) included in the broadcast message. Radio communication unit 11 provides the detected position registration ID to CPU 13 through bus 17 (step S21).

CPU 13 stores the position registration ID "AREA0001" obtained in step S21 in SRAM 15 as a residency area ID (step S22).

CPU 13 measures position of the mobile communication terminal by performing a stand-alone position measurement, and stores the measured longitude and latitude in SRAM 15 (step S23).

Periodically, radio communication unit 11 receives a broadcast message transmitted from base station 21; and, as described below, CPU 13 repeats steps S24 to S28.

Radio communication unit 11 receives a broadcast message transmitted from base station 21, and, on detecting position registration area ID included in the received broadcast message, provides the detected position registration area ID (for example, "AREA0003") through bus 17 to CPU 13 (step S24).

CPU 13 compares the position registration area ID "AREA0001" stored in SRAM 15 with the position registration area ID "AREA0003" obtained in step S24, and determines whether they agree (step S25).

Since, in this case, they do not agree (step S25), CPU 13 overwrites the position registration area ID "AREA0003" obtained in step S24 in SRAM 15 as residency area ID (step S26).

CPU 13 counts up a number of changes in position registration area stored in SRAM 15 by one (step S27). Accordingly, the number of changes in position registration area changes to "1" from the initial value of "0".

CPU 13 determines whether the number of changes in position registration area is greater than 14 (step S28). In this case, since the number of changes in position registration area is 1 and less than 15 (step S28: No), CPU 13 returns to step S24 and performs steps S24 to S28, described above, again.

When the number of changes in position registration area is determined to be 15 as in repeating steps S24 to S28 (step S28: Yes), CPU 13 clears the number of changes in position registration area and resets it to "0", and returns to step S23. CPU 13 measures its own approximate position again by performing stand-alone position measurement, and stores the approximate position in SRAM 15.

Thus, mobile communication terminal 10, according to the second embodiment, always maintains its approximate position necessary for performing network position measurement, and is thus able to provide services such as a navigation service, promptly.

Mobile communication terminal 10 according to the second embodiment does not need to store residency area ID or an approximate position in SRAM when powered off.

C. THIRD EMBODIMENT

The third embodiment of the present invention will now be described below. In the third embodiment so-called "Enhanced GPS (E-GPS)" method is assumed to be used, then operational load in mobile communication terminal 10 is reduced as compared to the first and second embodiments described above.

C-1. Configuration

Except for the fact that mobile communication terminal 10 according to the third embodiment is not able to perform stand-alone position measurement, the third embodiment has a common configuration with the first embodiment.

Specifically, ROM 14 of mobile communication terminal 10 does not store a program for performing position measurement. Instead, position measurement assist server 30 stores a program for calculating a position of mobile communication terminal 10. Accordingly, mobile communication terminal 10 transfers the received navigation message to position measurement assist server 30 when performing position measurement, and subsequently receives the result of position measurement calculation made by position measurement assist server 30.

C-2: Operation

Referring to the flowchart illustrated in FIG. 8, an operation for obtaining an approximate position according to the third embodiment will now be described below.

Figure 8:
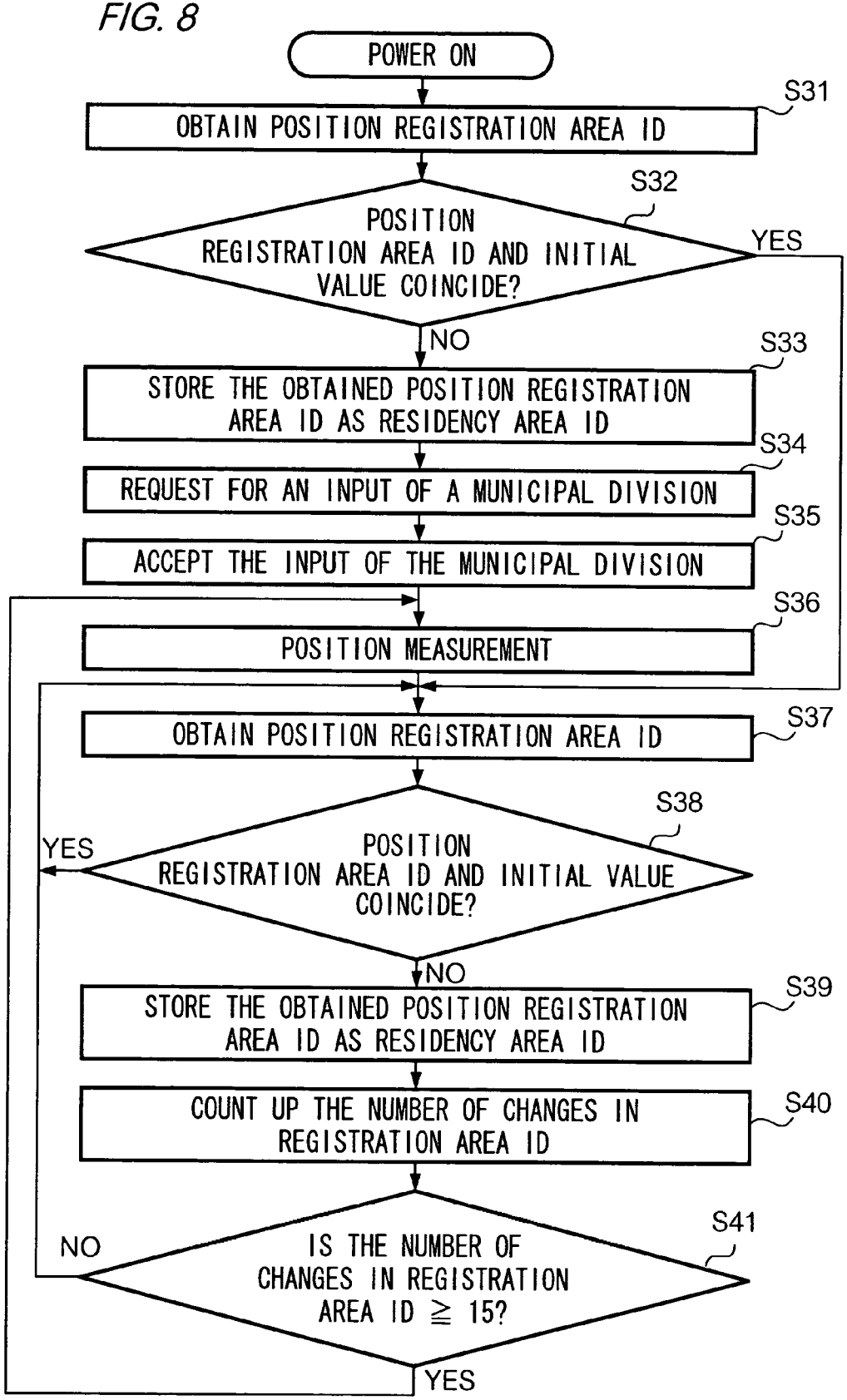
FIG. 8 is a flowchart showing an operation of CPU of a mobile communication terminal according to the third embodiment.
Figure 11:
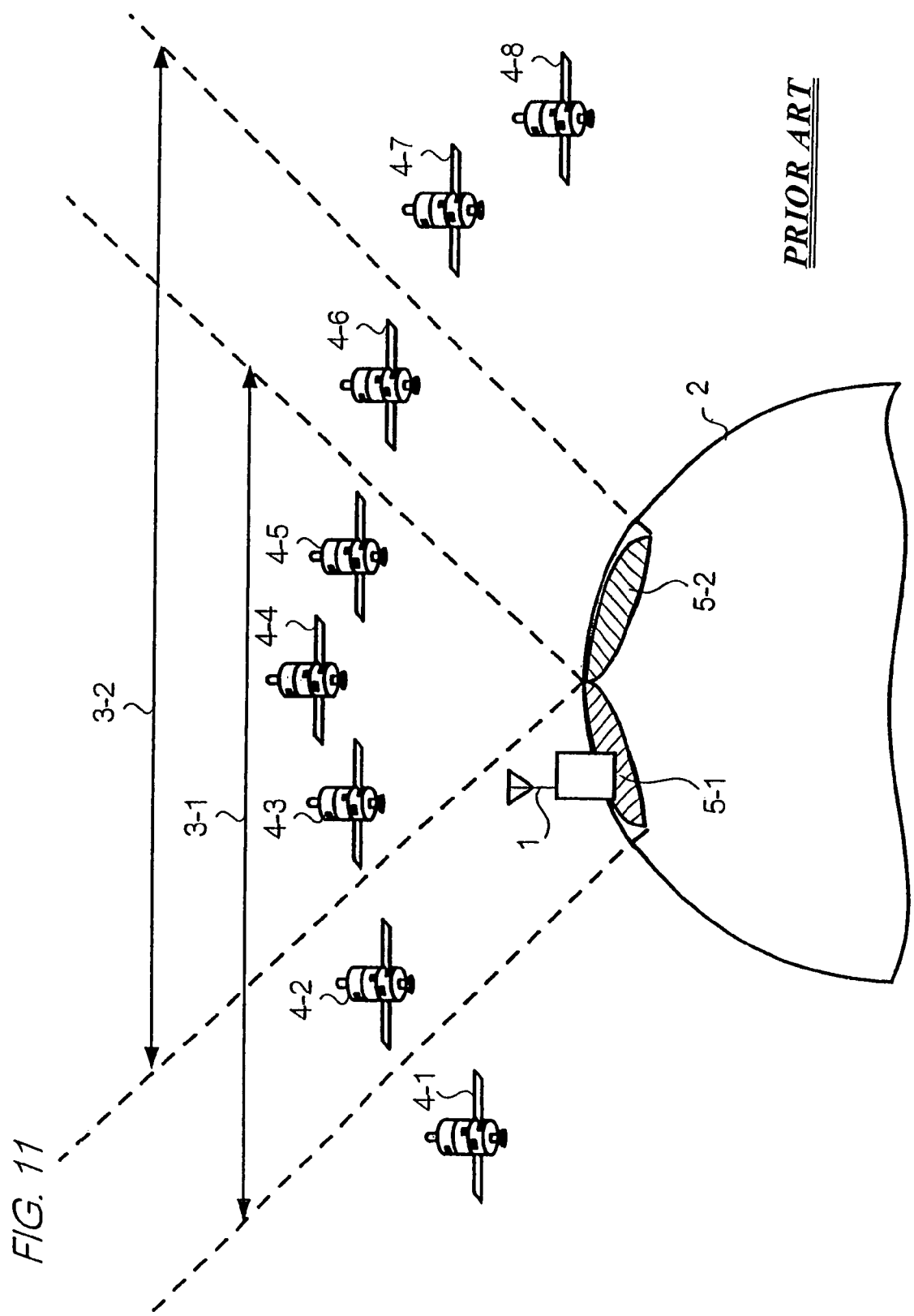
FIG. 11 is a schematic showing the relation between terminals and GPS satellites.

As mobile communication terminal is powered on, CPU 13 starts the operation shown in FIG. 8. The residency area ID stored in SRAM 15 at the moment of powering on is the same as an ID of the position registration area in which the mobile communication terminal 10 resided at the time of powering off (in this example, "AREA0002"). Thus, the approximate position stored in SRAM 15 is the same as the approximate position stored in SRAM 15 at the time of powering off. Thus, the initial value of number of changes in the residency area is set to "0".

Radio communication unit 11 receives a broadcast message transmitted from base station 21, and detects a position registration area ID (in this example "AREA0001") included in the broadcast message. Radio communication unit 11 provides the detected position registration area ID through bus 17 to CPU 13. Thus, CPU 13 obtains position registration area ID of position registration area where mobile communication terminal 10 resides at the time of powering up (step S31). CPU 13 compares the residency area ID "AREA0002" stored in SRAM 15 with the position registration area ID "AREA0001" obtained in step S21, and determines whether they agree (step S32).

In this case, they do not agree (step S32: No), and CPU 13 therefore proceeds in operation to step S33.

In another case when the residency area ID stored in SRAM 15 and the position registration area ID obtained in step S21 do agree in step S32, CPU 13 does not need to obtain a new approximate position, and therefore proceeds in operation to step S37.

In step S33 CPU 13 overwrites the position registration area ID "AREA0001" obtained in step S33 in SRAM 15 as residency area ID.

CPU 13 generates a screen image for instructing a user to input a name of a municipal division, where mobile communication terminal 10 resides, and displays the screen image on a liquid crystal display (LCD) display (step S34). The screen image instruction may instruct a user to input either a name of a municipal division or a code pre-assigned to each municipal division, or a screen showing a list of names or codes of municipal divisions, to allow a user to select a municipal division from the list.

When a user inputs a municipal division in accordance with the screen image instruction, CPU 13 accepts the input operation of a name or a code of the municipal division and stores it in SRAM 15 (step S35).

CPU 13 performs position measurement in accordance with the operations below (step S36). CPU 13 reads the name or the code of a municipal division stored in SRAM 15, requests position measurement assist server 30 to provide position measurement assist-data, by transmitting the name or the code of a municipal division through radio communication unit 11 to position measurement assist server 30.

Position measurement assist server 30, on receiving the name or the code of a municipal division, generates position measurement assist-data accordingly, and transmits them through mobile communication network 20 to mobile communication terminal 10.

CPU 13 of mobile communication terminal 10, on obtaining the position measurement assist-data, captures radio signals from GPS satellites 4 appointed by the position measurement assist-data, transmits navigation messages included in the radio signals through radio communication unit 11 to position measurement assist server 30 and request the server to perform an operation for measuring the position of the mobile communication terminal 10.

Position measurement assist server 30, on receiving the navigation message, calculates a position of the mobile communication terminal 10 on the basis of the navigation messages, and transmits the result of position measurement through mobile communication network 20 to mobile communication terminal 10.

CPU 13 of mobile communication terminal 10 obtains the result of the position measurement and stores it in SRAM 15.

Each time radio communication unit 11 receives a navigation message transmitted from base station 21, CPU 13 repeats steps S37 to S41 below.

Radio communication unit 11 receives a broadcast message transmitted from base station 21, and detects a position registration area ID included in the received broadcast message. Radio communication unit 11 provides the detected position registration area ID (for example, "AREA0003") through bus 17 to CPU 13.

CPU 13 compares the position registration area ID "AREA0001" stored in SRAM 15 with the position registration area ID "AREA0003" obtained in step S24, and determines whether they agree (step S38).

In this case they do not agree (step S38: No), and so CPU 13 overwrites the position registration area ID "AREA0003" obtained in step S37 in SRAM 15 as residency area ID (step S39).

CPU 13 counts up by one a number of changes in position registration area stored in SRAM 15 (step S40). Accordingly, the number of changes in position registration area changes from the initial value of "0" to "1".

CPU 13 determines whether the number of changes in position registration area is greater than 14 (step S41). In this case, the number of changes in position registration area is 1 and less than 15 (step S41: No), and so CPU 13 returns it operation to step S37 and performs steps S37 to S41 described above, again.

In this way CPU 13 repeats the steps S37 to S41 until the number of changes in position registration area is 15 (step S41: Yes), then CPU 13 clears the number of changes in position registration area stored in SRAM 15 and resets it to "0", and returns to step S36. CPU 13 measures its own approximate position again by performing stand-alone position measurement, and stores its approximate position in SRAM 15.

Thus, mobile communication terminal 10, according to the third embodiment, always maintains its approximate position being necessary to perform network position measurement, so that mobile communication terminal 10 can make use of its approximate position to provide services such as a navigation service, promptly.

Mobile communication terminal 10 according to the third embodiment can obtain its position promptly, even if mobile communication terminal 10 is not able to perform stand-alone position measurement. Thus, such services can be smoothly provided.

D. Modifications (1) Counting Method of Changes in Position Registration Area

In the first to third embodiments, each time position registration area ID received by mobile communication terminal 10 changes, a number of changes in position registration area is counted. However, it is to be noted that the methods for counting changes in position registration area are not restricted to those of the embodiments.

For example, counting table CT illustrated in FIG. 9 can be generated in SRAM 15, and it can be used for the counting. In FIG. 9, numerals 1 to 15 in a row for number of position registration areas denote numbers of position registration area to which a mobile communication terminal 10 has moved. A position registration area ID received by a mobile communication terminal 10 is stored from the first column one by one along the row for a number of position registration areas.

When a position registration area ID is stored in the column corresponding to number of position registration areas, "15", along the row for number of position registration areas, then all position registration IDs stored in the table are cleared, and a position registration area ID again is stored from the column corresponding to a number of position registration areas, "1".

However, a position registration ID that is the same as the position registration IDs already stored in counting table CT is not stored in counting table CT.

For example, if mobile communication terminal 10 receives, while moving, position registration terminal IDs "AREA0001", "AREA0012" and "AREA0008" in this order, the position registration IDs are stored in counting table CT as shown in FIG. 9. On the contrary, even if mobile communication terminal 10 receives, while moving, position registration terminal IDs "AREA0001","AREA0008", "AREA0001", "AREA0012" and "AREA0001" in this order, the position registration IDs are similarly stored in counting table CT as shown in FIG. 9, since a position registration ID is stored for the same IDs.

Thus, obtaining an approximate position of a mobile communication terminal 10 can be avoided, when it is not necessary. For example, if mobile communication terminal 10 round trips through less than 15 position registration areas, it is not necessary to obtain a new approximate position of the mobile communication terminal 10, since a number of position registration areas stored in counting table CT does not reach 15.

The size of position registration area is not restricted to around 10 kilometers in diameter. If the size of position registration area differs from around 10 kilometers, then the number of changes in position registration area, which is used as a reference to determine to perform obtaining approximate position, varies depending on the size of a position registration area.

(2) Configuration of Mobile Communication Terminal

In the first to third embodiments, mobile communication terminal 10 is equipped with both GPS functionality and communication functionality. However, these functionalities may be provided in separate equipment, respectively. For example, by connecting a cellular phone having communication functionality to a PDA with GPS functionality, the operation above may be performed in cooperation with these equipment.

(3) Configuration of Program

A program, which CPU 13 of mobile communication terminal 10 executes in order to perform position measurement operations described above, may be installed in the mobile communication terminal 10 as an application program. The application program may be provided, for example, in storing in a storage medium readable from CPU 13 of mobile communication terminal 10, such as magnetic storage media, optical storage media, or ROM. The application may be provided to mobile communication terminal 10 through a network such as the Internet.

(4) Criteria for Obtaining Approximate Position

In the first to third embodiments, an approximate position of mobile communication terminal 10 is obtained in accordance with the 150 kilometer criterion. The criterion for obtaining approximate position is set to 150 kilometers. However, the criterion is not limited to 150 kilometers.

The criterion for obtaining an approximate position has to correspond to the maximum range of distance where common position measurement assist-data is available. Thus, the criterion for obtaining an approximate position may vary in accordance with the conditions, for example, number of GPS satellites or the like.

(5) Determination of Movement Distance I

In the first to third embodiments, a movement distance is determined on the basis of number of changes in position registration area. However, methods for determining a movement distance are not restricted to the method. For example, base station 21 in an area may broadcast data unique to the area. Specifically, each position registration area ID in an area includes common upper digits. As shown in FIG. 3, for example, IDs of position registration areas included in a square area of 150 kilometers are set to "AREA11XX (XX are arbitrary)", so that two digits following "Area" are set to "11". The ID will also be referred to as position registration area identification data. Then, IDs of position registration areas included in the first adjoining square area of 150 kilometers are set to "AREA22XX (XX are arbitrary)", so that two digits following "Area" are set to "22". Then, IDs of position registration areas included in the second adjoining square area of 150 kilometers are set to "AREA33XX (XX are arbitrary)", so that two digits following "Area" are set to "33".

Thus, mobile communication terminal 10 determines its movement distance on the basis of two digits following "Area" of the received position registration area IDs. In this case, the upper two digits of position registration area identification data corresponds to data for determining movement distance of mobile communication terminal 10.

(6) Determination of Movement Distance II

In the first to third embodiments, a movement distance is determined on the basis of a number of changes in position registration area. However, methods for determining a movement distance are not restricted to the method. For example, if mobile communication terminal 10 performs a handover operation, a number of handover operations may be counted. Since mobile communication terminal has moved from a cell to an adjoining cell on this occasion, a movement distance of mobile communication terminal can be computed in a unit of size of the cell by counting number of handover operations.

(7) Obtaining an Approximate Position by User Input

In the third embodiment, a name of a municipal division or a code pre-assigned to a municipal division is inputted, but the input is not restricted to that of a municipal division. For example, divisions in weather reports or divisions by municipalities may be used. Especially, in a case that a square area of a municipal division exceeds 150 kilometers, it is desirable to use other divisions for inputting approximate position.

E. Applications

The present invention is not limited to provide the navigation services exemplified in the first to third embodiments. The present invention is able to provide various type of services using the measured position to a user. For example, a position related data providing service for providing a location of the nearest restaurant can be provided, and a service for providing the third party to find positions of the person carrying mobile communication terminal 10 can be provided.

The invention claimed is:

1. A method of measuring a position of a mobile communication terminal within an area accommodated by a mobile communication network, comprising:

obtaining, from the mobile communication network, a position registration area identifier, wherein the position registration area identifier depends upon a location of the mobile communication terminal within the area accommodated by the mobile communication network;

storing the position registration area identifier in a memory of the mobile communication terminal;

monitoring a number of changes in the position registration area identifier;

detecting that the number of changes in the position registration area identifier since a precise position of the mobile communication terminal was calculated exceeds a threshold;

in response to each detection that the number of changes in the position registration area identifier since the precise position of the mobile communication terminal was calculated exceeds the threshold, determining the precise position of the mobile communication terminal, wherein determination of the precise position of the mobile communication terminal comprises:

retrieving, from the memory, the position registration area identifier;

sending, through the mobile communication network, a request for position measurement assist data to a position assistance server, wherein the request for position measurement assist data includes the position registration area identifier;

in response to receipt of the position measurement assist data, obtaining, at the mobile communication terminal, location data from a satellite; and in response to obtaining the location data, sending a request for calculation of the precise position of the mobile communication terminal to the position assistance server, wherein the request includes the location data; and receiving the precise position of the mobile communication terminal at the mobile communication terminal from the position assistance server.

2. The method of claim 1, further comprising:

enabling a user interface to receive selected geographic location information; and receiving the selected geographic location information.

3. The method of claim 2, wherein the user interface includes a display, and wherein enabling the user interface to receive the selected geographic location information comprises:

displaying a list of names or codes associated with a plurality of municipal divisions.

4. The method of claim 2, wherein said receiving the selected geographic location information comprises:

receiving a selection of a municipal location from a list of names or codes, wherein each of the names or codes is associated with one of a plurality of municipal divisions.

5. The method of claim 2, wherein said obtaining the position registration area identifier further comprises:

retrieving, from the memory, an initial position registration area identifier, wherein the initial position registration area identifier is the position registration identifier stored in the memory before the mobile communication terminal powers down;

determining whether the initial position registration area identifier matches the position registration area identifier; and in response to determination that the initial position registration area identifier mismatches the obtained position registration area identifier, displaying on the user interface a request for input of a municipal division as the selected geographic location information.

6. The method of claim 2, further comprising:

in response to receipt of the selected geographic location information, determining the precise position of the mobile communication terminal based upon the selected geographic location information.

7. The method of claim 2, further comprising:

sending, through the mobile communication network, an initial request for the position measurement assist data to the position assistance server, wherein the initial request for position measurement assist data includes the selected geographic location information; and in response to receipt of the position measurement assist data from the position assistance server, obtaining, at the mobile communication terminal, the location data from the satellite.

8. The method of claim 7, further comprising:

sending the location data to the position assistance server; and receiving, from the position assistance server, the precise location of the mobile communication terminal.

9. The method of claim 1, wherein the mobile communication network includes a plurality of residency areas;

wherein each of the residency areas includes at least one radio cell, and a base station corresponding to each radio cell operates to execute radio communication with the mobile communication terminal, the method further comprising:

the base station transmitting residency area identification information that corresponds to a respective residency area of the plurality of residency areas in which the mobile communication terminal is located to the mobile communication terminal.

10. The method of claim 9, wherein the residency area identification information includes the position registration area identifier that corresponds to the respective residency area.

11. The method of claim 1, wherein the satellite is one of a plurality of satellites, and wherein the position measurement assist data includes satellite identification data indicative of a plurality of satellites, data expressive of delay conditions of radio signals from the plurality of satellites, and data to enable correction of errors in a stand-alone position measurement;

wherein obtaining, at the mobile communication terminal, location data comprises:

receiving, at the mobile communication terminal, radio signals from the satellites indicated by the satellite identification data; and wherein determination of the precise position of the mobile communication terminal is based upon data obtained from the radio signals, the data expressive of delay conditions, and the data to enable correction of errors.

12. A computer readable storage medium for storing a computer program for a mobile communication terminal within an area accommodated by a mobile communication network comprising:

a computer readable medium comprising computer program code, the computer program code executable on a processor of the mobile communication terminal, the computer program code comprising:

computer program code to obtain, from the mobile communication network, a position registration area identifier, wherein the position registration area identifier depends upon a location of the mobile communication terminal within the area accommodated by the mobile communication network;

computer program code to store the position registration area identifier in a memory of the mobile communication terminal;

computer program code to monitor a number of changes in the position registration area identifier;

computer program code to detect that the number of changes in the position registration area identifier since a precise position of the mobile communication terminal was calculated exceeds a threshold;

computer program code to, in response to each detection that the number of changes in the position registration area identifier exceeds the threshold, determine the precise position of the mobile communication terminal, wherein the computer program code to determine the precise position of the mobile communication terminal comprises:

computer program code to retrieve, from the memory, the position registration area identifier;

computer program code to send, through the mobile communication network, a request for position measurement assist data to a position assistance server, wherein the request for position measurement assist data includes the position registration area identifier;

computer program code to, in response to receipt of the position measurement assist data, obtain, at the mobile communication terminal, location data from a satellite; and computer program code to send a request for calculation of the precise position of the mobile communication terminal to the position assistance server, wherein the request includes the location data; and computer program code to receive the precise position of the mobile communication terminal at the mobile communication terminal from the position assistance server.

13. The computer readable storage medium of claim 12, further comprising:

computer program code to enable a user interface to receive selected geographic location information; and computer program code to receive the selected geographic location information.

14. The computer readable storage medium of claim 13, further comprising:

computer program code to display a list of names or codes associated with a plurality of municipal divisions on the user interface.

15. The computer readable storage medium of claim 13, wherein said computer program code to receive the selected geographic location information comprises:

computer program code to receive a selection of a municipal location from a list of names or codes, wherein each of the names or codes is associated with one of a plurality of municipal divisions.

16. The computer readable storage medium of claim 13, further comprising:

Computer program code to, in response to receipt of the selected geographic location information, determine the precise position of the mobile communication terminal based upon the selected geographic location information.

17. The computer readable storage medium of claim 13, further comprising:

computer program code to send, through the mobile communication network, an initial request for the position measurement assist data to the position assistance server, wherein the initial request for position measurement assist data includes the selected geographic location information; and computer program code to, in response to receipt of the position measurement assist data from the position assistance server, obtain, at the mobile communication terminal, the location data from the satellite.

18. The computer readable storage medium of claim 17 further comprising:

computer program code to send the location data to the position assistance server; and computer program code to receive, from the position assistance server, the precise location of the mobile communication terminal.

19. A mobile communication terminal for providing navigation information within an area accommodated by a mobile communication network, comprising:

a memory;

a communication interface configured to communicate with the mobile communication network;

a processor in communication with the communication interface and the memory, wherein the processor is configured to obtain, through the communication interface, a position registration area identifier from the mobile communication network, wherein the position registration area identifier depends upon a location of the mobile communication terminal within the area accommodated by the mobile communication network;

the mobile terminal configured to store the position registration area identifier in the memory;

the processor is further configured to monitor a number of changes in the position registration area identifier;

the processor is further configured to detect that the number of changes in the position registration area identifier since a precise position of the mobile communication terminal was last calculated exceeds a threshold;

in response to each detection that the number of changes in the position registration area identifier since the precise position of the mobile communication terminal was last calculated exceeds the threshold, the mobile terminal configured to determine the precise position of the mobile communication terminal, wherein:

the processor is further configured to retrieve the position registration area identifier from the memory;

the processor is further configured to send, with the communication interface, a request for position measurement assist data to a position assistance server, wherein the request for position measurement assist data includes the position registration area identifier;

in response to receipt of the position measurement assist data from the position assistance server, the mobile terminal is further configured to obtain location data from a satellite;

in response to receipt of the location data from the satellite, the processor is further configured to send a request for calculation of the precise position of the mobile communication terminal to the position assistance server, wherein the request for calculation of the precise position includes the location data obtained from the satellite; and the communication interface is further configured to receive the precise position of the mobile communication terminal from the position assistance server.

20. The mobile communication terminal of claim 19, further comprising a user interface, wherein, the user interface is configured to receive selected geographic location information.

21. The mobile communication terminal of claim 20, wherein in response to receipt of the selected geographic location information, the processor is further configured to determine an initial precise position of the mobile communication terminal based upon the selected geographic location information.

22. The mobile communication terminal of claim 21, wherein:

the processor is further configured to send, through the mobile communication network, an initial request for the position measurement assist data to the position assistance server, wherein the request for position measurement assist data includes the selected geographic location information;

in response to receipt of the position measurement assist data from the position assistance server, the mobile communication terminal is further configured to obtain the location data from the satellite;

in response to receipt of the location data from the satellite, the processor is further configured to send the location data obtained from the satellite to the position assistance server;

the processor is further configured to receive, via the communication interface, the initial precise location of the mobile communication terminal from the position assistance server; and the processor is further configured to store the initial precise location as the precise location of the mobile communication terminal.

23. The mobile communication terminal of claim 20, wherein the user interface includes a display, and the user interface is configured to display a plurality of geographic divisions on the display; and wherein user interface is further configured to receive a selection of one of the displayed geographic divisions as the selected geographic location information.

24. The mobile communication terminal of claim 20, wherein the user interface includes a display, and the user interface is configured to display a list of geographic identifiers, wherein each of the geographic identifiers is associated with a respective one of a plurality of municipal divisions; and wherein the user interface is further configured to receive a selection of one of the geographic identifiers as the selected geographic location information.

25. The mobile communication terminal of claim 24, wherein the geographic identifiers include at least one of a plurality of codes associated with municipal divisions and a plurality of names of municipal divisions.

* * * * *

UNITED STATES PATENT AND TRADEMARK OFFICE
CERTIFICATE OF CORRECTION

PATENT NO. : 7,590,424 B2  Page 1 of 1
APPLICATION NO. : 10/343075
DATED : September 15, 2009
INVENTOR(S) : Yamamoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 574 days.

Signed and Sealed this

Twenty-first Day of September, 2010

David J. Kappos
*Director of the United States Patent and Trademark Office*